United States Patent [19]

Komeya et al.

[11] 4,117,095

[45] Sep. 26, 1978

[54] METHOD OF MAKING α TYPE SILICON NITRIDE POWDER

[75] Inventors: Katsutoshi Komeya, Yokohama; Hiroshi Inoue, Kawaguchi; Takao Ohta, Tokyo, all of Japan

[73] Assignee: Tokyo Shibaura Electric Co., Ltd., Japan

[21] Appl. No.: 725,669

[22] Filed: Sep. 22, 1976

[30] Foreign Application Priority Data

Sep. 22, 1975 [JP] Japan ............................. 50-113762

[51] Int. Cl.² ............................................. C01B 21/06
[52] U.S. Cl. .................................... 423/344; 106/73.5
[58] Field of Search ........................ 423/344; 106/73.5

[56] References Cited

U.S. PATENT DOCUMENTS

| | | | |
|---|---|---|---|
| 1,054,901 | 3/1913 | Bosch et al. | 423/344 X |
| 1,104,384 | 7/1914 | Potter et al. | 423/344 X |
| 3,244,480 | 4/1966 | Johnson et al. | 423/344 |
| 3,728,436 | 4/1973 | Krikorov | 423/344 X |
| 3,855,395 | 12/1974 | Cutler | 423/344 |
| 3,959,446 | 5/1976 | Mazdiyasni et al. | 423/344 |

FOREIGN PATENT DOCUMENTS

1,121,293 7/1968 United Kingdom ..................... 423/344

OTHER PUBLICATIONS

Komeya et al. "J. of Materials Science" 10/1975, pp. 1243-1246.

*Primary Examiner*—Jack Cooper
*Attorney, Agent, or Firm*—Oblon, Fisher, Spivak, McClelland & Maier

[57] ABSTRACT

α-Silicon nitride powder which is used as a raw material for the preparation of high strength silicon nitride with additives such as magnesia and yttrium oxide, and other sintered materials suitable for high temperature gas turbine engine components and the like, is prepared by heating a powdered mixture of silica, carbon and metallic silicon in a nitrogen containing atmosphere and then subjecting the material to a heat treatment in an oxidizing atmosphere for decarbonization of said material.

5 Claims, 1 Drawing Figure

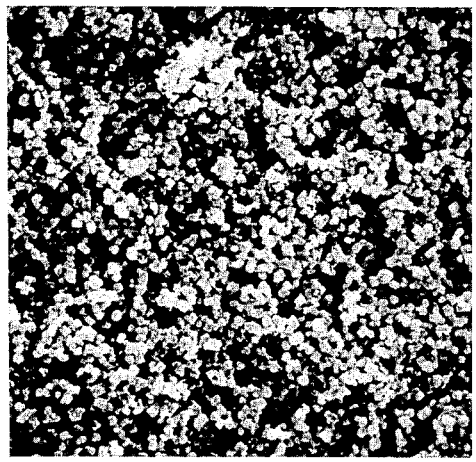

METHOD OF MAKING α TYPE SILICON NITRIDE POWDER

BACKGROUND OF THE INVENTION

1. Field of the Invention

The present invention relates to a method for preparing α silicon nitride (αSi$_3$N$_4$) powder, and more particularly to αSi$_3$N$_4$ powder of high quality which is obtained in a high yield.

2. Description of the Prior Art

It is known that sintered silicon nitride - yttrium oxide or magnesium oxide (Si$_3$N$_4$-Y$_2$O$_3$ or Si$_3$N$_4$-MgO) materials possess excellent mechanical strength and heat resistance, and therefore have been used in high temperature gas turbine engines. However, when the conventional Si$_3$N$_4$ sintered products are used in practice as materials which are subjected to high temperatures and high stresses, their physical and chemical stabilities and reliability at high temperatures are absolutely essential requirements. Their thermal and mechanical properties, which are particularly important factors, are greatly affected by the nature of the starting materials and the quantities of impurities which these materials contain. Moreover, with regard to the silicon nitride it is desirable that it should contain as much αSi$_3$N$_4$ powder as possible. Especially desired is a finely divided αSi$_3$N$_4$ powder for use in sintering materials.

In the past Si$_3$N$_4$ powder has been synthesized by the following methods.

(1) 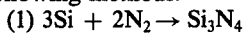 $3Si + 2N_2 \rightarrow Si_3N_4$ (2) A vapor phase reaction in which silicon tetrachloride or silane is reacted with ammonia as starting materials

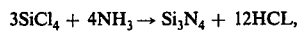 $3SiCl_4 + 4NH_3 \rightarrow Si_3N_4 + 12HCL,$ and the like;

(3) A method of nitridizing SiO$_2$ obtained by reducing silica (SiO$_2$) with carbon in the following stoichiometric ratio

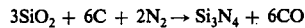 $3SiO_2 + 6C + 2N_2 \rightarrow Si_3N_4 + 6CO$ and the like.

In the case of method (1), the nitridization of Si is an exothermic reaction, and therefore the process must be carefully conducted so as to carefully control the generation of heat. For example, the Si which is commercially selected for the reaction is comparatively coarse-grained powder, and therefore, fine grinding is generally conducted after nitridization. Therefore, the admixture of impurities into the product during the grinding process is unavoidable, and although there is no objection to the use of this material for refractory materials in general, such as firebricks, it is not suitable for high temperature gas turbines.

Also, in the case of reaction (2) the product is suitable, for instance, for the surface coating or semiconductor elements and the like, but it cannot be regarded as suitable for the mass production of inorganic refractory materials.

In the case of reaction (3) thoroughly purified SiO$_2$ powder and C powder must be used as starting materials, and there is also the disadvantage that the product produced by reacting stoichiometric quantities of SiO$_2$ and C comprises a mixed system of αSi$_3$N$_4$, βSi$_3$N$_4$, a silicon oxynitride (Si$_2$ON$_2$), SiC and the like. Moreover, the yield of αSi$_3$N$_4$ is low. In other words, this reaction system has the advantage that the reaction procedure is relatively easy. On the other hand, however, as described above the yield of αSi$_3$N$_4$ product is low, and therefore the method is not practially preferred.

A need, therefore, continues to exist for a method by which high quality α silicon nitride can be manufactured in high yield.

SUMMARY OF THE INVENTION

Accordingly, one object of the present invention is to provide a method of manufacturing high quality α silicon nitride in high yield.

Another object of the invention is to provide a high quality α silicon nitride.

Still another object of the invention is to provide a high quality αSi$_3$N$_4$ powder which is suitable for use as refractory material in high temperature and high stress environments.

Briefly, these objects and other objects of the present invention as hereinafter will become more readily apparent can be attained in a method for preparing α silicon nitride powder by (a) mixing silica powder, carbon powder and metallic silicon powder;

(b) heating said mixture in a non-oxidizing atmosphere containing nitrogen such that reduction and nitridization reactions occur which produce silicon nitride; and (c) heating said silicon nitride in an oxidizing atmosphere to effect decarbonization of said silicon nitride.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE is a microphotograph having a manification of 3,000, and showing the fine particle distribution of α silicon nitride powder manufactured by the method of the present invention.

DESCRIPTION OF THE PREFERRED EMBODIMENTS

The essential feature of the discovery of the present invention is that if in the reduction and nitridization of silica (SiO$_2$), the quantity of carbon (C) which is used is a quantity somewhat in excess of the amount needed to reduce SiO$_2$ and if a specified quantity of metallic silicon (Si) is also present and the nitridizing reaction and a heat treatment under an oxidizing atmosphere are conducted at specified temperatures, then α silicon nitride (αSi$_3$N$_4$) of high quality can be produced in high yield which is extremely fine-grained.

The present invention involves a method manufacturing α silicon nitride (αSi$_3$N$_4$) powder, characterised in that a mixture of powdered reactants in which the ratio proportions of the reactants by weight are 1 part silica (SiO$_2$) powder, 0.4 to 4 parts carbon (C) powder and 0.01 to 2 parts metallic silicon (Si) powder, preferably 0.1 to 2 parts, is heated and fired at 1350° to 1550° C., preferably 1350° to 1480° C. under a non-oxidizing atmosphere containing nitrogen, wherein reduction and nitridization reactions take place and silicon nitride (Si$_3$N$_4$) is produced. Thereafter, the product obtained is subjected to a heat treatment in an oxidizing atmosphere such as air, preferably at 600° to 700° C.

Suitable sources of carbon for the method of the invention beside carbon powders such as carbon black include hydrocarbon materials. Suitable sources of elemental silicon include organosilicon compounds which degrade when heated to metallic silicon.

In the silica-carbon-metallic silicon ($SiO_2$-C-Si) mixture used as the starting material in the present process, the preferred $SiO_2$:C:Si weight ratio is selected as 1:0.4 to 4:0.1 to 2 for the following reasons. That is, if less than 0.4 parts of C is used to 1 part of $SiO_2$, then a large quantity of $Si_2ON_2$ is formed and the quantity of the $\alpha$ silicon nitride ($\alpha$-$Si_3N_4$) produced is small. On the other hand, if more than 4 parts of C are used per 1 part of $SiO_2$, then $\beta$ silicon nitride ($\beta$-$Si_3N_4$) and silicon carbide (SiC) are produced and as a result the purity and the yield of the $\alpha$ silicon nitride ($\alpha Si_3N_4$) are reduced. Furthermore, if less than 0.1 part of Si is used per part of $SiO_2$, this has only a slight affect upon increasing the yield of $\alpha Si_3N_4$. On the other hand, if more than 2 parts of Si are used per part of $SiO_2$, difficulty is achieved in obtaining fine-grained $Si_3N_4$ powder having a grain diameter not greater than 1 $\mu$ m. Furthermore, grinding processes and the like are necessary and because of this other impurities are admixed into the powder and the preferred silicon nitride powder is not obtained. The $SiO_2$, C and Si starting materials preferably are of high purity of at least 99%. Moreover, concerning grain sizes, $SiO_2$ and C preferably have an average grain diameter not greater than 1 $\mu$m and Si has an average grain diameter not greater than 10 $\mu$m.

In the heating and firing of the $SiO_2$-C-Si mixture in the process of the present invention, the atmosphere over the reactants can be $N_2$, $NH_3$, $N_2$ and hydrogen ($H_2$), $N_2$ and an inert gas such as Ar, He or the like or some other gaseous component such as CO, but the main reaction gas constituent must be at least one of $N_2$ or $NH_3$. The reason for this is that it has been confirmed experimentally that one of these gaseous materials has a great effect on the production of highly pure $\alpha Si_3N_4$. On the other hand, the heating and firing temperatures of the silicon nitride under this atmosphere in which the main reaction gas is $N_2$ or $NH_3$ is selected within the range from 1350° to 1550° C., preferably 1350° to 1480° C. The reason for this is that if the temperature employed is less than 1350° C., $Si_3N_4$ is not formed readily. If the temperature exceeds the upper limit, formation of SiC occurs, and the required $\alpha Si_3N_4$ powder suitable for materials which are to be used under high temperatures and high stresses can not be obtained.

Also, after the silicon nitride product is heated and fired in an atmosphere in which the main reaction gas is $N_2$ or the like, a heat treatment under an oxidizing atmosphere is conducted for the purpose of removing the residual carbon. The temperature of this treatment is selected within the range of 600° to 800° C., preferably 600° to 700° C. The reason for this is that if in the removal of the carbon from the reaction mixture which has not reacted and is therefore still present, the heat treatment is conducted over the abovementioned temperature range, oxidization of the $Si_3N_4$ that has been produced results, and the required $\alpha Si_3N_4$ powder is not obtained.

If, as described above, the reduction and nitridization of $SiO_2$ by the present invention is employed, in which an excess of carbon far beyond the stoichiometric amount is used and, on the other hand, in particular a specific quantity of Si is also present, then the reduction of the $SiO_2$ is substantially promoted and also the nitridization of the Si proceeds smoothly and $\alpha Si_3N_4$ powder of high quality, containing a large quantity of $Si_3N_4$, is obtained in good yield. When the method of the present invention is used, $\alpha Si_3N_4$ powder suitable for making a $Si_3N_4$ sintered materials which are required to withstand high temperatures and high stresses, is easily obtained. The reason for this is believed to be as follow. The primary reaction which occurs is the reduction of silica by carbon $SiO_2 + C \rightarrow SiO + CO$. This reaction is a solid phase reaction, and when the $C/SiO_2$ ratio is high, the reaction becomes relatively rapid and the SiO which is produced reacts with the $N_2$ or $NH_3$ more easily. In this reaction the SiO and the $N_2$ or $NH_3$ may be present in the vapor state, and therefore it may be said that the proportion of carbon that is present governs the reduction and nitridization reactions of the SiO. In this instance, if the quantity of carbon is the stoichiometric amount of only slightly in excess of this amount, $Si_2ON_2$ is formed, and the conversion of $Si_2ON_2$ to $\alpha Si_3N_4$ becomes extremely difficult. However, as described above, the quantity of carbon is greatly in excess compared to the stoichiometric amount, and it appears that for this reason the formation of $Si_2ON_2$ is inhibited and $\alpha Si_3N_4$ is easily formed.

The presence of an excessive quantity of carbon gives rise to the smooth production of $\alpha Si_3N_4$. However, on the other hand, the presence of carbon also results in the formation and admixture of SiC with the product and the presence of other impurities in the product. Moreover, the $\alpha Si_3N_4$ content of the product becomes relatively low. But in the present invention, a specified quantity of Si powder is also present in the reaction system. The Si powder itself is nitridized, but the reaction of $SiO_2 + Si \rightarrow SiO$ proceeds to a greater extent and because of this, SiO vapor is easily formed, and therefore the formation of $\alpha Si_3N_4$ by the subsequent $SiO + C + N_2 \rightarrow \alpha Si_3N_4$ reaction proceeds easily. As a result, the required $\alpha Si_3N_4$ is obtained as a fine grained powder. It appears that for this reason the content and yield of the silicon nitride are vastly improved, and the formation of SiC and the formation and admixture of other impurities are inhibited. In particular, the fact that the formation of SiO is promoted accelerates the subsequent formation of $\alpha Si_3N_4$, and therefore a uniformly shaped fine-grained powder is synthesized as is evident from the microphotograph of the FIGURE. It has been found that a highly realiable, sintered material is obatined by sintering this material.

Thus, in the present invention an $\alpha Si_3N_4$ powder is obtained which is of high quality and which contains a high content of $\alpha Si_3N_4$. Moreover, the nitride contains only small quantities of SiC and other impurities. Thus, the method of the present invention is suitable for making $Si_3N_4$ powder which is suitable as a raw material for the preparation of sintered structural materials which are required to withstand high temperature and high stresses, for instance, for gas turbine engine components.

Having generally described this invention, a further understanding can be obtained by reference to certain specific examples which are provided herein for purposes of illustration only and are not intended to be limiting unless otherwise specified.

A $SiO_2$ powder having an average grain diameter of 13 m$\mu$m, C (carbon black) powder having an average grain diamter of 29 m$\mu$m and Si powder having an average grain diameter of 1.8 μm were mixed in the proportions (parts by weight) shown in Table 1 to form 19 kinds of powdered materials (including the reference examples).

The powdered mixtures were heated and fired at 1350° to 1500° C. for 2 to 5 hours under a $N_2$, $N_2$-$H_2$, $N_2$-Ar or $NH_3$ atmosphere, and then subjected to a heat treatment under an air atmosphere at 700° C. for 8 hours, and $Si_3N_4$ containing powders were thus obtained. For each of the $Si_3N_4$ powders thus obtained, the average particle size, the nitrogen content (weight %), the $\alpha Si_3N_4$ content (weight %), which was confirmed by X-ray diffraction patterns, the SiC content (weight %) and the quantities of Si and other metallic impurities (weight %) were determined in each case and the results are all shown in Table 1. In Table 1, specimens 1 to 14 represent embodiments of the present invention, and specimens a to g represent reference examples.

TABLE 1

| Materials | Composition (weight ratio) | | | Reaction Conditions | | | Characteristics of Produced Powder | | | | Impurities (%) |
|---|---|---|---|---|---|---|---|---|---|---|---|
| | $SiO_2$ | C | Si | Temp. (° C) | T (hr) | Atmosphere | S(μm) | N(%) | $\alpha$-$Si_3N_4$(%) | SiC(%) | |
| 1 | 1 | 2 | 0.2 | 1400 | 5 | $N_2$ | 0.78 | 37.3 | 98 | 0.08 | 0.09 |
| 2 | 1 | 3 | 1 | 1400 | 5 | $N_2$ | 0.78 | 36.8 | 98 | 0.18 | 0.22 |
| 3 | 1 | 2 | 2 | 1400 | 5 | $N_2$ | 0.77 | 37.0 | 98 | 0.07 | 0.09 |
| 4 | 1 | 4 | 0.5 | 1400 | 5 | $N_2$ | 0.8 | 37.1 | 98 | 0.32 | 0.23 |
| 5 | 1 | 0.4 | 0.1 | 1400 | 5 | $N_2$ | 0.77 | 34.8 | 96 | <0.01 | 0.05 |
| 6 | 1 | 2 | 0.2 | 1400 | 5 | $N_2$ | 0.77 | 36.1 | 97 | <0.01 | 0.05 |
| 7 | 1 | 2 | 0.2 | 1380 | 5 | $N_2$ | 0.74 | 34.0 | 97 | 0.01 | 0.04 |
| 8 | 1 | 2 | 0.2 | 1450 | 2 | $N_2$ | 0.83 | 37.0 | 98 | 0.1 | 0.08 |
| 9 | 1 | 2 | 0.2 | 1400 | 2 | $N_2$ + $H_2$ 1:1 | 0.75 | 36.9 | 98 | 0.06 | 0.07 |
| 10 | 1 | 2 | 0.2 | 1400 | 2 | $NH_3$ | 0.74 | 37.1 | 89 | 0.06 | 0.07 |
| 11 | 1 | 2 | 0.2 | 1350 | 2 | $NH_3$ | 0.7 | 31.6 | 97 | 0.02 | 0.06 |
| 12 | 1 | 2 | 0.2 | 1400 | 2 | $N_2$ + Ar 1:1 | 0.66 | 35.1 | 97 | 0.05 | 0.08 |
| 13 | 1 | 2 | 0.1 | 1400 | 5 | $N_2$ | 0.68 | 36.9 | 96 | 0.06 | 0.05 |
| 14 | 1 | 2 | 0.05 | 1400 | 5 | $N_2$ | 0.7 | 25.1 | 94 | 0.04 | 0.05 |
| a | 1 | 4.5 | — | 1400 | 2 | $N_2$ | 0.8 | 19.2 | 83 | 0.91 | 0.27 |
| b | 1 | 2 | — | 1400 | 2 | $N_2$ | 0.71 | 16.3 | 81 | 0.50 | 0.09 |
| c | 1 | 2 | — | 1500 | 2 | $N_2$ | 1.2 | 35.2 | 82 | 2.91 | 0.09 |
| d | 1 | 0.4 | — | 1400 | 2 | $N_2$ | 0.77 | 9.1 | 77 | 0.04 | 0.05 |
| e | 1 | 0.4 | — | 1500 | 2 | $N_2$ | 1.1 | 34.1 | 80 | 1.17 | 0.05 |
| f | — | — | 1 | 1400 | 2 | $N_2$ | 2.0 | 36.6 | 66 | — | 0.01 |
| g | 1 | 2 | 0.05 | 1400 | 2 | $N_2$ | 0.78 | 19.0 | 83 | 0.04 | 0.07 |

INDEX OF TABLE 1
$SiO_2$ = silica powder
C = carbon powder
Si = metallic silicon powder
temp. = temperature during reaction treatment (centrigrade)
T = time during reaction treatment (hour)
S = average grain diameter (micron meter)
N = nitrogen content (weight percent)
$\alpha$-$Si_3N_4$ = $\alpha$-$Si_3N_4$ content (weight percent)
SiC = SiC content (weight percent)
Impurities = other metallic impurities (weight percent)

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A method for manufacturing an α silicon nitride powder, consisting essentially of the steps of:
   (a) admixing 1 part silica powder, 0.4 to 4 parts carbon powder and 0.01 to 2.0 parts metallic silicon powder;
   (b) heating said mixture at 1350°-1550° C. in a non-oxidizing atmosphere containing at least one of nitrogen or ammonia and optionally at least one component selected from the group consisting of CO, $H_2$ and AR to effect the formation of α silicon nitride; and
   (c) heating the so formed α silicon nitride at 600°-800° C. in an oxidizing atmosphere to effect decarbonization of said silicon nitride.

2. The method of claim 1, wherein the weight ratio of metallic silicon powder is 0.1 to 2.

3. The method of claim 1, wherein said formation is effected at a temperature of 1350° C. to 1480° C.

4. The method of claim 1, where said decarbonization is effected at a temperature of 600° to 700° C.

5. A method of manufacturing an α silicon nitride powder, consisting essentially of the steps of:
   (a) forming a mixture of silica powder, carbon powder and metallic silicon powder is proportions by weight of 1:0.4 to 4:01 to 2;
   (b) heating said mixture in a non-oxidizing atmosphere containing nitrogen at 1350° to 1480° C. to effect the formation of α silicon nitride; and
   (c) heating the so formed α silicon nitride in an oxidizing atmosphere at a temperature of 600° to 700° C. to effect decarbonization of said silicon nitride.

* * * * *